Patented Dec. 13, 1949

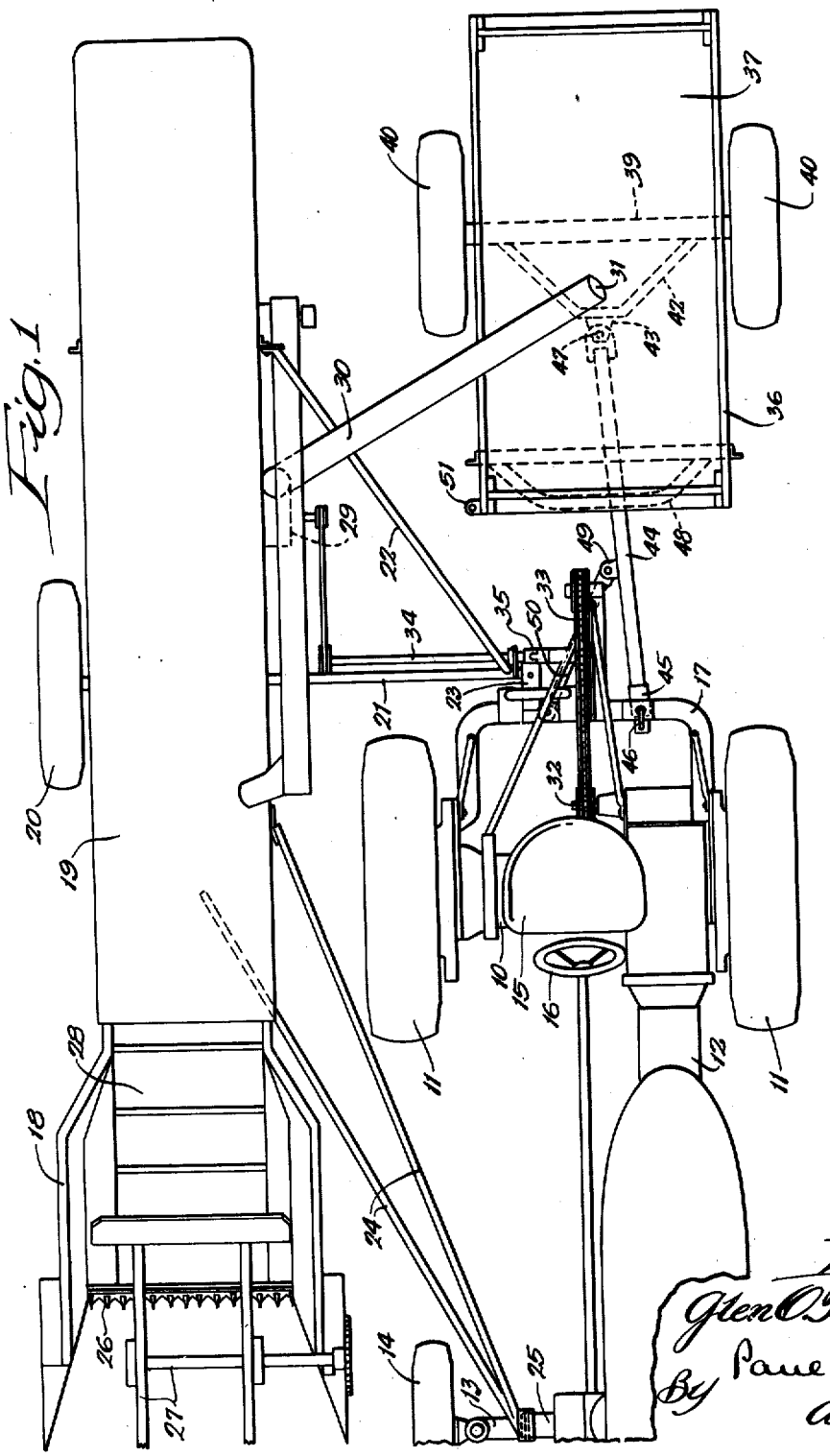

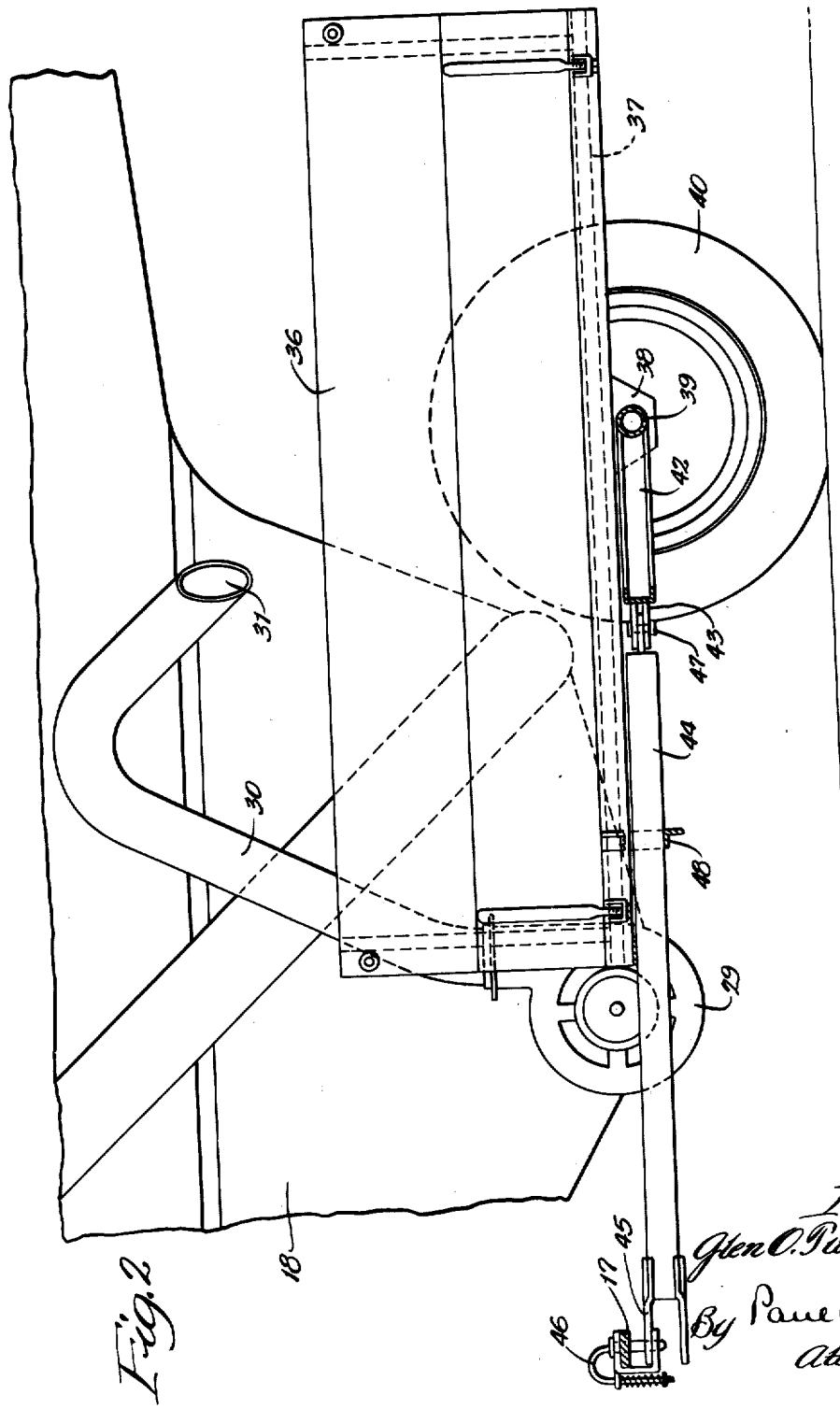

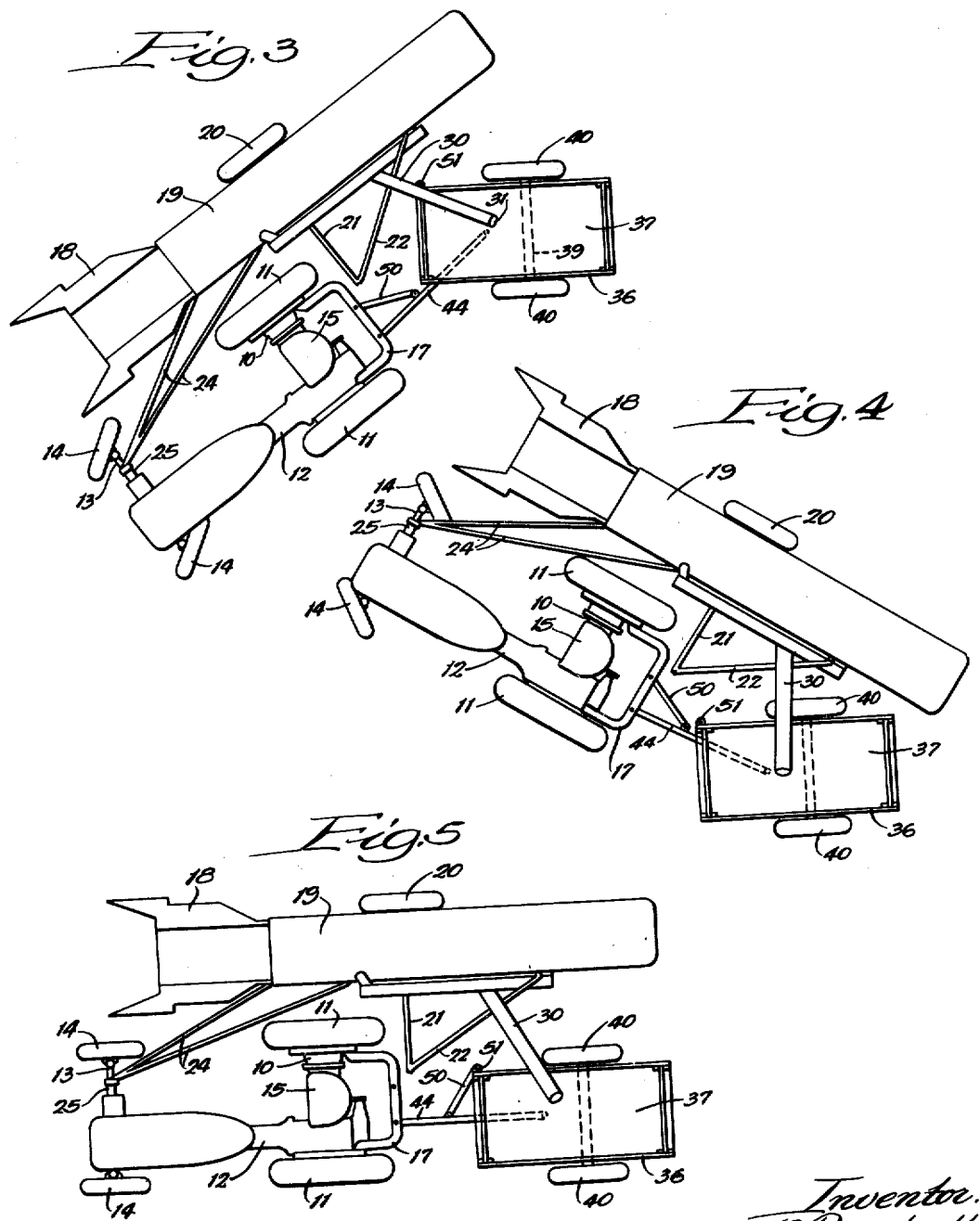

2,491,232

UNITED STATES PATENT OFFICE 2,491,232

HITCH CONSTRUCTION FOR TRAILING GRAIN RECEPTACLES

Glen O. Turnbull, Rock Island, Ill., assignor to International Harvester Company, a corporation of New Jersey Application December 27, 1943, Serial No. 515,671

9 Claims. (Cl. 56—10)

1

This invention relates to a tractor implement combination in which a trailing receptacle is provided for receiving grain or other crop gathered or treated by the implement. More specifically, the invention relates to a hitch construction for a trailing grain cart used with a tractor and a side-connected harvester thresher. In the development of tractor attached implements, certain farm machines, such as corn pickers and harvester threshers, have been constructed to be mounted alongside a tractor. In constructions of this type it is desirable to trail a wheeled receptacle back of the tractor for receiving material or crop from the harvesting machine. Problems are encountered in devising a trailing unit which follows properly on turns and which remains under the discharge spout from the harvesting machine so as to evenly distribute the harvested crop in the receptacle.

The principal object of the present invention is the construction of a hitch arrangement for a trailing cart used in combination with a tractor and a side-connected harvesting machine therefor.

A more specific object is the provision of a hitch construction incorporating a rigid draw-bar extension to obtain an effective draw-bar point a sufficient distance rearwardly of the tractor to obtain the proper trailing operation of a wheeled receptacle to be used in connection with a side-mounted implement.

Another object is to provide a hitch construction as pointed out with means for readily converting the hitch to a standard tongue suitable for trailing of the receptacle behind a source of power.

These objects and others, which will appear in the disclosure to follow, are accomplished by a construction, one embodiment of which is shown in the drawings, in which:

Figure 1 is a plan view of a tractor, a side-connected harvester thresher, and a trailing grain cart;

Figure 2 is an elevation of the hitch construction and certain parts of the associated machines shown in Figure 1;

Figure 3 is a diagrammatic plan view showing the position of the cart with respect to the tractor and harvester thresher when a sharp turn is made to the left;

Figure 4 is a view similar to Figure 3 showing the position of the trailing cart when a sharp turn is made to the right; and Figure 5 is a plan view showing the hitch brace member secured to the trailing cart for normal trailing operations.

In the drawings, a four-wheeled tractor of the offset type has been illustrated. This tractor consists essentially, in so far as the present disclosure is concerned, of a rear axle structure 10,

2 spaced traction wheels 11, a narrow body portion 12, a front axle structure 13, and steerable front wheels 14. An operator's seat 15 and a steering gear 16 are also illustrated. The tractor is provided with a rearwardly extending U-shaped draw-bar 17, which is secured at its ends to the rear axle structure 10. The side-mounted implement illustrated is a harvester thresher and includes a forward harvester unit 18 and a thresher unit 19, said units being mounted on a frame structure supported in its entirety at two points on the tractor and on a wheel 20 spaced laterally from the tractor. Said frame structure includes frame bars 21 and 22 extending laterally from the thresher unit 19 to a point at the rear of the draw-bar 17 where they are pivotally connected to the tractor by means of suitable connections including a bracket 23.

The frame structure of the implement also includes a pair of forwardly extending frame members 24 which are joined together and pivotally connected on a longitudinal axis to a bracket 25 on the tractor.

Certain portions of the harvester unit 18 are shown diagrammatically to better illustrate the nature of an implement to which the invention is applicable. Cutting means 26, a reel 27, and a conveyer 28 provide means for cutting the standing grain and moving it rearwardly into the threshers. Conventional threshing mechanism removes the grain from the straw and delivers the grain to an impeller type of discharge unit 29 at the side of the harvester unit as shown in Figure 2. Said unit discharges the threshed grain through a pipe 30 to a discharge spout 31. The pipe 30 is curved upwardly, rearwardly, and downwardly to the discharge spout in order to lock said spout at a preferred position for receiving the grain as will be hereinafter described.

Certain portions of the means for driving the mechanism of the harvester thresher are illustrated in Figure 1. A power take-off shaft 32, extending laterally at the rear of the tractor provides means for driving a chain 33 by which power is transmitted to a laterally extending shaft 34 carried by the frame structure of the harvester thresher. A universal joint 35 is indicated to provide the necessary flexibility in the power line for movement of the implement relative to the tractor about a longitudinal axis.

A trailing grain receptacle, best defined as, a wheeled cart, is provided for receiving the threshed grain from the discharge spout 31. Said cart has a box or body 36 supported on a platform type of framework 37, which is in turn carried by brackets 38 directly on a transverse axle 39. Pneumatic tired wheels 40 are mounted on the axle 39. As shown in Figures 1 and 2, forwardly converging channel members 42 provide a point of pivotal connection in the form of spaced clevis members 43 for pivotally connecting a draft member 44 to the trailing cart. Said draft member extends forwardly beyond the cart, being provided at its forward end with spaced clevis members 45 by means of which it may be connected to any draw-bar construction.

As illustrated in Figure 2, one of the clevis members is connected by a spring-pressed bolt 46 with the draw-bar 17 of the tractor. It will be noted that the point of pivotal connection of the draft member 44 with the clevis 43, which is made by means of a bolt 47, is a relatively short distance ahead of the cart axle 39 and a substantial distance rearwardly of the front end of the cart. It will also be noted that this axis of connection is substantially under the discharge end of the spout 31.

To retain the draft member 44 in position and to provide for its oscillation about the point of connection with the cart, an angle bar 48 extends entirely across the cart near the forward end thereof, spaced from the platform frame structure 37 a sufficient distance to allow free movement of the draft member.

An attaching ear 49 is secured to the draft member 44 spaced rearwardly from the tractor draw-bar 17 and forwardly from the front end of the car. A brace member 50 is pivotally connected to said ear at one end and is adapted to be connected at its other end either to the draw-bar 17 or to an ear 51 at the forward right-hand corner of the trailer cart. When said brace is connected to the brace of the draw-bar of the tractor at a point spaced laterally from the connection point of the draft member 44, a draw-bar extension is, in effect, provided which is rigid in so far is displacement in a lateral direction of the rear end is concerned. It will be noted that the draft member 44 is connected a substantial distance to one side of the tractor and on the opposite side from the connection of the implement. Even though the draft member extends angularly back towards the center of the tractor to some extent, the effective hitch point is a substantial distance from the center line of the tractor opposite the attaching side of the implement. The effect of this hitch point is to counterbalance, by the amount of any draft necessary to pull the cart, the amount of side draft produced by side mounting of the implement.

With the brace 50 in position for operating the machine in the field, Figure 3 illustrates the position the cart takes upon an extreme turn to the left. The rear end of the draft member 44 under such a turning condition moves to the right as the turning of the tractor is substantially about a pivot point under its left traction wheel or slightly forwardly and outwardly therefrom. The substantial movement of the rear end of the draft member turns the cart to the position shown in Figure 3 due to its movement and to the short distance between the point of connection with the cart and the axis of the wheels. In this extreme position the cart remains in a favorable position for the discharge of grain and does not engage or interfere with the operation of the implement, as there is sufficient clearance between the cart and all parts of the side-connected implement. In Figure 4, an extreme right turn is illustrated. The cart takes the opposite position due to movement of the rear end of the draft member such as to rapidly angle the cart to the position shown. It will be noted that the cart clears all parts of the side-connected implement, although the implement as in this case be backed around toward the cart due to its rearward extension beyond the vertical pivotal axis of the combined machine. Figure 5 illustrates the hitch construction with the brace bar removed from the tractor and connected to the cart. This is the arrangement preferably used for trailing the cart during transport or for trailing it when it is disconnected from the tractor implement combination and connected to another tractor or truck for removal from the field or for delivering the harvested grain to a suitable storage facility.

It is understood that applicant claims as his invention all modifications in trailer cart constructions and hitch arrangements falling within the scope of the appended claims.

What is claimed is:

1. A wheeled cart adapted to be connected to a draw-bar structure and trailed alongside a harvesting implement for receiving material therefrom comprising in combination with a draw-bar structure, a wheel-supported platform, a receptacle mounted thereon, a draft member connected at one end to the draw-bar structure and at its other end pivotally connected to the platform at a point spaced rearwardly from the front of the receptacle and forwardly of the platform wheel axis, and a brace member pivotally connected to the draft member, said brace member being connectable to the draw-bar structure to provide a rigid draw-bar extension from the draw-bar structure and to the platform to form a rigid draw-bar structure on the cart.

2. A wheeled cart adapted to be connected to a draw-bar structure and trailed alongside a harvesting implement for receiving material therefrom comprising, a platform, a wheel axle on the platform, a receptacle mounted thereon in a balanced position over the axle, a draft member connected at one end to the draw-bar structure and at its other end pivotally connected to the platform at a point spaced rearwardly of the front of the receptacle and forwardly of the axle, means to permit predetermined angular movement of the draft member in a lateral direction, and a brace member pivotally connected to the draft member, said member being connectable to the draw-bar structure to provide a rigid draw-bar extension from the draw-bar structure and to the platform to form a rigid draw-bar structure on the cart.

3. A wheeled cart adapted to be connected to a draw-bar structure and trailed alongside a harvesting implement having a crop-discharge means for receiving material therefrom comprising in combination with a draw-bar structure and a crop-discharge means, the wheeled cart located under the discharge means, a draft member connected at one end of the draw-bar structure and at its other end pivotally connected to the platform at a point spaced rearwardly of the front of the receptacle and forwardly of the wheel axis, a guide member extending across the platform spaced therebeneath to restrain movement of the draft member in a vertical direction and to permit predetermined angular movement thereof in a lateral direction, and a brace member pivotally connected to the draft member between its front end and the front of the platform, said member being connectable to the draw-bar structure to provide a rigid draw-bar extension from the draw-bar structure and to the platform to form a rigid draw-bar structure on the cart.

4. A wheeled cart adapted to be connected to a draw-bar structure and trailed alongside a harvesting implement for receiving material therefrom comprising in combination with a draw-bar structure and a crop-discharge means, the wheeled cart located under the discharge means, a draft member connected at one end to the draw-bar structure and at its other end pivotally connected to the platform at a point spaced forwardly of the wheel axis and substantially under the crop-discharge means, a guide member extending across the platform spaced therebeneath to restrain movement of the draft member in a vertical direction and to permit predetermined angular movement thereof in a lateral direction, and a brace member pivotally connected to the draft member between its front end and the front of the platform, said member being connectable to the draw-bar structure to provide a rigid draw-bar extension from the draw-bar structure and to the platform to form a rigid draw-bar structure on the cart.

5. A tractor and implement combination comprising a tractor having a draw-bar structure at the rear thereof, an implement connected alongside the tractor and extending rearwardly a substantial distance beyond the tractor, a wheeled grain receptacle located behind the tractor, a grain delivery means extending from the implement over the wheeled receptacle, a draft member connected to the tractor draw-bar structure and pivotally connected to the wheeled receptacle a short distance ahead of the wheel axis, and a brace member connected to said draft member and with the draw-bar structure to provide a rigid extension whereby the receptacle will follow around behind the tractor on a sharp turn in either direction without engagement with the implement.

6. A tractor and implement combination comprising a tractor having a draw-bar structure at the rear thereof, an implement connected alongside the tractor and extending rearwardly a substantial distance beyond the tractor, a wheeled grain receptacle located behind the tractor, a grain delivery means extending from the rear portion of the implement with its discharge end being over the wheeled receptacle, a draft member connected to the tractor draw-bar structure and pivotally connected to the wheeled receptacle a short distance ahead of the wheel axis and substantially under the discharge end of the conveyor, and a brace member connected to said draft member and with the draw-bar structure to draft member and with the draw-bar structure to provide an extension whereby the receptacle will follow around behind the tractor on a sharp turn in either direction without engagement with the implement.

7. A tractor and implement combination comprising a tractor having a draw-bar extending rearwardly therefrom, an implement connected alongside the tractor and extending rearwardly a substantial distance beyond the tractor, a wheeled grain receptacle located behind the tractor, a grain delivery means extending from the rear portion of the implement over the receptacle, a draft member pivotally connected to the tractor draw-bar and to the receptacle a short distance ahead of the wheel axis, and a brace member pivotally connected to said draft member and connectable with the draw-bar of the tractor to provide a rigid draw-bar extension whereby the wheeled receptacle will follow around behind the tractor on a sharp turn in either direction without engagement with the implement and will remain under the grain discharge means.

8. A tractor and implement combination comprising a tractor having a draw-bar extending rearwardly therefrom and an implement connected alongside the tractor and extending rearwardly a substantial distance behind the tractor, a wheeled grain receptacle located behind the tractor, grain delivery means extending from the implement and terminating in a discharge spout substantially above the center of the wheeled receptacle, a draft member pivotally connected to the tractor draw-bar and to the wheeled receptable a short distance ahead of the wheel axis and substantially under the discharge spout, and a brace member pivotally connected to said draft member and connectable with the draw-bar of the tractor to provide a rigid draw-bar extension whereby the wheeled receptacle will follow around behind the tractor on a short turn in either direction without engagement with the implement and will remain substantially under the grain discharge spout, said brace member being also connectable with the grain receptacle to provide a standard towing hitch for transporting the wheeled receptacle.

9. A tractor and implement combination comprising a tractor having a draw-bar extending rearwardly therefrom, an implement connected alongside the tractor and extending rearwardly a substantial distance behind the tractor, a two-wheel cart located behind the tractor, said cart having a grain receptacle substantially balanced over the wheel axis, grain delivery means extending from the implement and terminating over the receptable substantially centrally thereof, a draft member pivotally connected to the tractor draw-bar and to the cart under the receptable and substantially under the grain delivery means and a short distance ahead of the wheel axis, and brace means connecting said draft member and the draw-bar of the tractor to provide a rigid draw-bar extension whereby the cart will follow around behind the tractor on a short turn in either direction without engagement with the implement and with the grain delivery means remaining substantially over the center of the grain receptacle.

GLEN O. TURNBULL.

REFERENCES CITED

The following references are of record in the file of this patent:

UNITED STATES PATENTS

| Number | Name | Date |
| --- | --- | --- |
| 28,796 | Walker | June 19, 1860 |
| 1,391,962 | Mangel | Sept. 27, 1921 |
| 1,477,345 | Hagadone | Dec. 11, 1923 |
| 1,646,455 | Johnson et al. | Oct. 25, 1927 |
| 1,947,556 | Krause | Feb. 20, 1934 |
| 1,953,235 | Kelley | Apr. 3, 1934 |
| 2,017,758 | Kowalsky | Oct. 15, 1935 |
| 2,327,494 | Brown | Aug. 24, 1943 |
| 2,371,842 | Pool et al. | Mar. 20, 1945 |